United States Patent [19]

Natarajan

[11] Patent Number: 5,228,115
[45] Date of Patent: Jul. 13, 1993

[54] HYBRID BACKTRACK/LOOKAHEAD SEARCH TECHNIQUE FOR CONSTRAINT-SATISFACTION PROBLEMS

[75] Inventor: Kadathur S. Natarajan, Millwood, N.Y.

[73] Assignee: International Business Machines Corporation, Armonk, N.Y.

[21] Appl. No.: 835,010

[22] Filed: Feb. 12, 1992

Related U.S. Application Data

[63] Continuation of Ser. No. 502,080, Mar. 29, 1990.

[51] Int. Cl.[5] ............................................. G06F 15/18
[52] U.S. Cl. ...................................................... 395/51
[58] Field of Search ......................................... 395/51

[56] References Cited

PUBLICATIONS

Artificial Intelligence, vol. 41, No. 3, Jan. 1990, Amsterdam NL, pp. 273-312, "Enhancement Schemes for Constraint Processing: Backjumping . . . ", Rina Dechter.
Journal of the ACM, vol. 12, No. 4, Oct. 1965, New York, US, pp. 516-524, "Backtrack Programming", Solomon Golomb, et al.
"Parallel Lookahead Technique for Constraint Satisfaction", IBM Technical Discl. Bulletin, vol. 31, No. 10, Mar. 1989.
"Estimating the Size of a Backtrack Search During the Search Operation", IBM Technical Disclosure Bulletin, vol. 30, No. 8, Jan. 1988.
"Efficient Search Technique" IBM Tech. Discl. Bulletin, vol. 30, No. 1, Jun. 1987.
A. K. Mackworth, "Consistency in Networks of Relations", Artificial Intelligence, vol. 8, pp. 99-118, 1977.
R. M. Haralick and L. G. Shapiro, "The Consistent Labeling Problem: Part I", IEEE Trans. on Pattern Analysis & Maching Intelligence, vol. PAMI-1 No. 2, Apr. 1979, pp. 173-184.
R. M. Haralick & L. G. Shapiro, "The Consistent Labeling Problem: Part II", IEEE Trans. on Pattern Analysis and Machine Intelligence, vol. 2, May 1980, pp. 193-203.
B. A. Nudel, "Consistent-Labeling Problems and Their Algorithms: Expected-Complexities and Theory Based Heuristics", Artificial Intelligence (Special Issue on Search & Heuristics), vol. 21, pp. 135-178, 1983.
E. C. Freuder, "A Sufficient Condition for Backtrack-Free Search", Journal of the ACM, vol. 29, No. 1, 1982, pp. 24-32.
J. R. Bitner and E. M. Reinhold, "Backtrack Programming Techniques", Comm. of the ACM, vol. 18, pp. 651-656, 1975.
R. M. Haralick & G. L. Elliott, "Increasing Tree Search Efficiency for Constraint Satisfaction Problems", Artificial Intelligence, pp. 263-313, 1980.
S. Golomb & L. Baumert, "Backtrack Programming", Jrnl. of the ACM, vol. 12, 1965, pp. 516-524.
D. E. Knuth, "Estimating the Efficiency of Backtrack Programs", Mathematics of Computation, vol. 29, 1975, pp. 121-136.

*Primary Examiner*—Michael R. Fleming
*Assistant Examiner*—Robert W. Downs
*Attorney, Agent, or Firm*—Perman & Green

[57] ABSTRACT

A method of solving a constraint-satisfaction problem with a data processor includes the steps of (a) providing a search tree structure (10) representing a plurality (N) of variables (X), the search tree structure having a plurality of levels; (b) searching (L) shallow levels of the search tree structure by employing a backtrack search method wherein (L) is less than or equal to a specified value H; and (c) searching (M) remaining, deeper, levels of the search tree structure by employing a lookahead search method. The step of searching (L) shallow levels of the search tree structure includes a step of binding a set of $X_1$ through $X_H$ variables each to an element from its domain such that no constraints are violated. The step of searching (M) remaining, deeper, levels of the search tree structure includes the steps of, given the bindings for the set of variables $X_1$ through $X_H$, determining for each variable $X_i$, $H < i \leq N$ a list of feasible values any one of which could be assigned to $X_i$; and storing the lists of feasible values in a Feasible_Value table data structure.

5 Claims, 2 Drawing Sheets

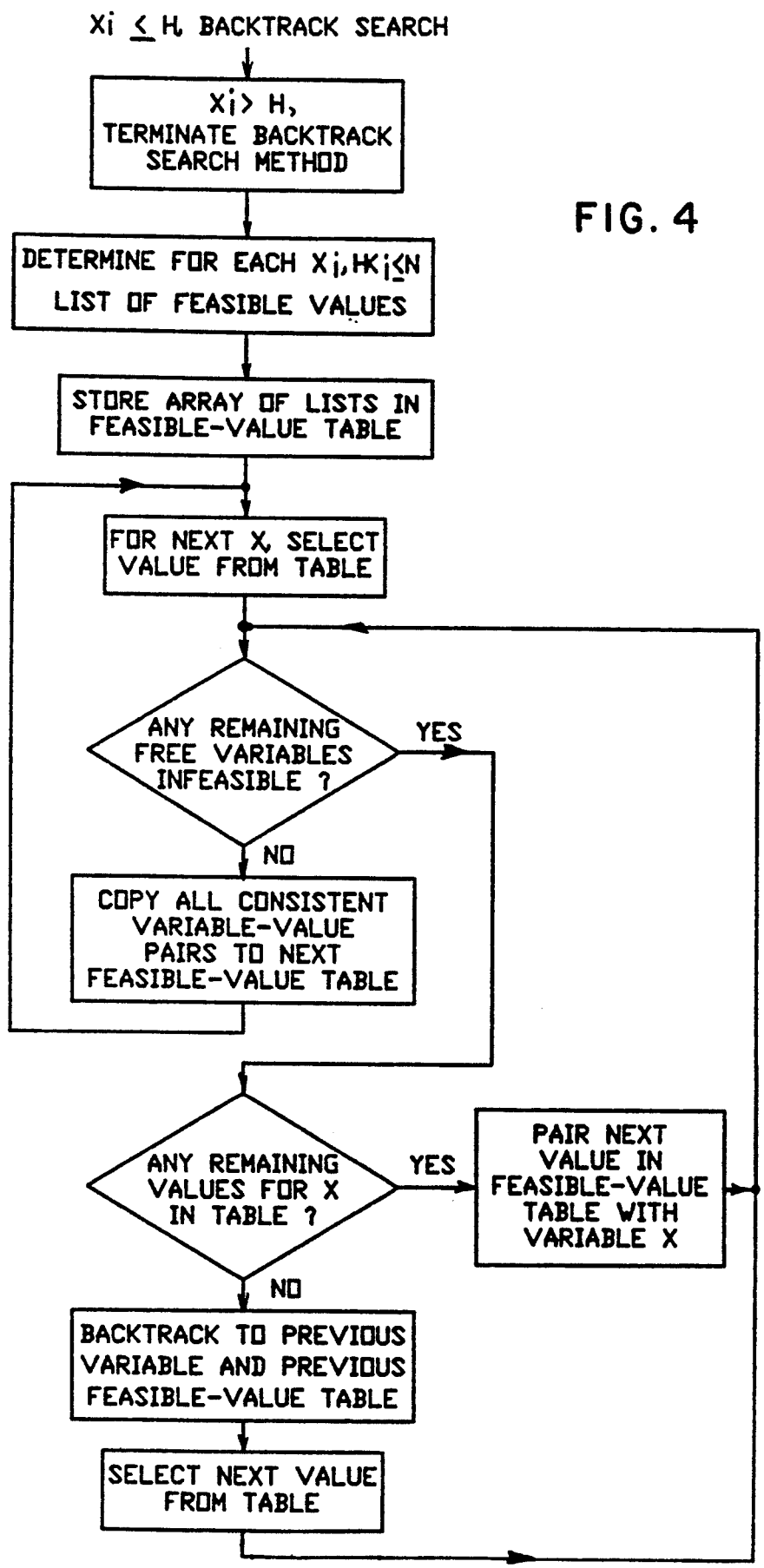

HYBRID BACKTRACK/LOOKAHEAD SEARCH TECHNIQUE FOR CONSTRAINT-SATISFACTION PROBLEMS

This application is a continuation of application Ser. No. 07/502,080, filed Mar. 29, 1990.

FIELD OF THE INVENTION

This invention relates generally to methods of providing solutions to constraint-satisfaction problems and, in particular, relates to a hybrid search method that combines the storage efficiency advantage of a backtrack search technique with the processing time efficiency advantage of a lookahead search technique.

BACKGROUND OF THE INVENTION

Many problems in Artificial Intelligence and combinatorial search applications are formulated as constraint-satisfaction problems. The solution of a constraint-satisfaction problem typically requires that an arbitrary set of constraints be satisfied. A search procedure is employed to enumerate all solutions that simultaneously satisfy all constraints on the problem. A prototypical constraint-satisfaction problem is known as the N-Queens problem and concerns the placement of N-Queens on an NxN checkerboard so that no Queen can take another.

Solution techniques that have been developed for this class of problems include the backtrack search algorithm. An example is found in a journal article entitled "Backtrack programming", Journal of the ACM, Vol. 12, 1965, pp. 516-524 by S. Golomb et al.

Variations of the backtrack search algorithm are found in the following journal articles: A. K. Mackworth, "Consistency in Networks of Relations", Artificial Intelligence, Vol. 8, pp. 99-118, 1977; R. M. Haralick and L. G. Shapiro, "The Consistent Labeling Problem: Part I", IEEE Trans. on Pattern Analysis and Machine Intelligence, Vol. 1, April, 1979, pp. 173-184; B. A. Nudel, "Consistent-Labeling Problems and Their Algorithms: Expected-Complexities, and Theory Based Heuristics", Artificial Intelligence (Special issue on Search and Heuristics), Vol. 21, pp. 135-178, 1983; E. C. Freuder, "A Sufficient Condition for Backtrack-Free Search", Journal of the ACM, Vol. 29, No. 1, 1982, pp. 24-32; and J. R. Bitner and E. M. Reingold, "Backtrack Programming Techniques", Comm. of the ACM, Vol. 18, pp. 651-656, 1975.

An important advantage of the backtrack search technique is that it is efficient in the use of memory space required to solve a problem. However, for many problems, a backtrack search technique can be inefficient in regards to required processing time.

One technique that is known to be efficient in the use of processing time for solving constraint-satisfaction problems is a lookahead search technique such as that known as the Forward Checker Algorithm described by R. M. Haralick and G. L. Elliott, "Improving Tree Search Efficiency for Constraint Satisfaction Problems", Artificial Intelligence pp. 263-313, 1980. However, this lookahead technique does not possess the memory usage efficiency of the backtrack search approach.

That is, at shallow levels of a search tree a lookahead search technique, such as the Forward Checker, expends a considerable amount of computation effort and time in the maintenance of memory data structures, such as keeping track of level-dependent lists of feasible values of variables. At deeper levels of the search tree, the backtrack search tends to be time inefficient for reasons described by Mackworth in the above referenced article "Consistency in Networks of Relations".

It is thus an object of the invention to provide a method for executing a search for all solutions to a constraint-satisfaction problem that includes both the memory usage efficiency of the backtrack search technique and the processing time efficiency of the lookahead search technique.

SUMMARY OF THE INVENTION

The foregoing problems are overcome and the objects of the invention are realized by apparatus and method for solving a constraint-satisfaction problem. The method includes the steps of (a) providing a search tree structure representing a plurality (N) of variables (X), the search tree structure having a plurality of levels; (b) searching (L) shallow levels of the search tree structure by employing a backtrack search method wherein (L) is less than or equal to a specified level (H) of the search tree; and (c) searching (M) remaining, deeper, levels of the search tree structure by employing a lookahead search method. The step of searching (L) shallow levels of the search tree structure includes a step of binding a set of $X_1$ through $X_H$ variables each to an element from an associated domain such that no constraints are violated. The step of searching (M) remaining, deeper, levels of the search tree structure includes the steps of, given the bindings for the set of variables $X_1$ through $X_H$, determining for each variable $X_i$, $H < i \leq N$ a list of feasible values any one of which could be assigned to $X_i$; and storing the lists of feasible values in a Feasible_Value table data structure.

BRIEF DESCRIPTION OF THE DRAWING

The above set forth and other features of the invention are made more apparent in the ensuing Detailed Description of the Invention when read in conjunction with the attached Drawing, wherein:

FIG. 4 is a flowchart showing in greater detail the lookahead search method employed for levels of the search tree having a value greater than H.

DETAILED DESCRIPTION OF A PREFERRED EMBODIMENT OF THE INVENTION

Constraint-satisfaction problems have the following generic form:

$$G(S) = P_1(S_1) \& P_2(S_2) \& \ldots P_M(S_M)$$

where, G(S) is the problem to be solved and $S = \{X_1, X_2, \ldots X_N\}$ is a set of N variables. Each variable $X_i$ takes on values from its domain $D_i$ that has $L_i$ values. For $1 \leq i \leq M$, $P_i$ represents a constraint defined over a set of variables $S_i$, where $S_i \subseteq S$. Given a set of bindings for the variables in $S_i$, whether $P_i$ is satisfied can be determined by performing a test of consistency of the bindings. A solution to problem G is a binding of values to each of the variables in S such that (a) each constraint $P_i$ is satisfied, and (b) each variable that is common to two or more constraints is consistently bound to the same element. An amount of search effort, and the required data processing time, is predominantly determined by the product of the total number of consistency tests and the computational effort per consistency test. For the ensuing description, emphasis is placed on the number of tests performed and an assumption is made that all tests require unit costs.

Figure 1:
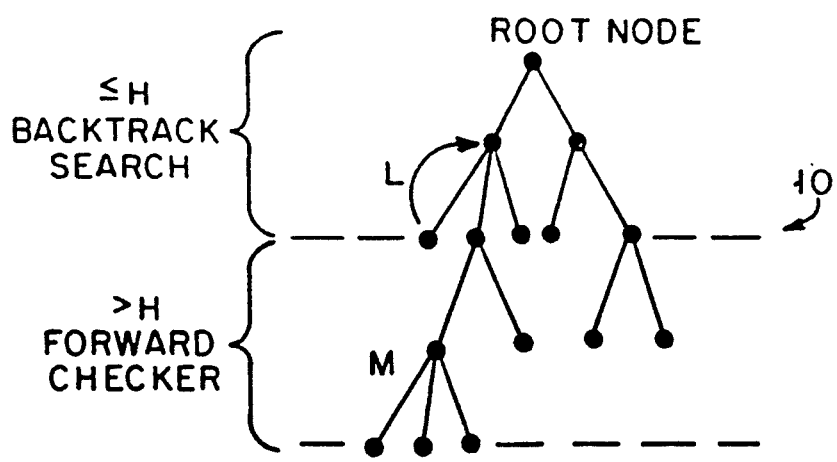
FIG. 1 illustrates a search tree for a constraint-satisfaction problem, the search tree being partitioned into a first region wherein backtrack searching is employed and into a second region wherein lookahead searching is employed.

As can be seen in FIG. 1 the method of the invention operates to conduct a backtrack search at (L) shallow levels of a search tree 10 and to conduct a lookahead search (Forward Checker) at (M) deeper levels of the search tree 10. The sum of (L) and (M) is equal to the total height of the search tree 10. By performing backtrack searching up to a specified level (H) of the search tree 10 and then switching to a lookahead technique, such as the Forward Checker, for levels greater than H the Hybrid Search method of the invention achieves both the memory space advantage of backtrack searching and the reduced processing time advantage of lookahead searching.

Figure 2:
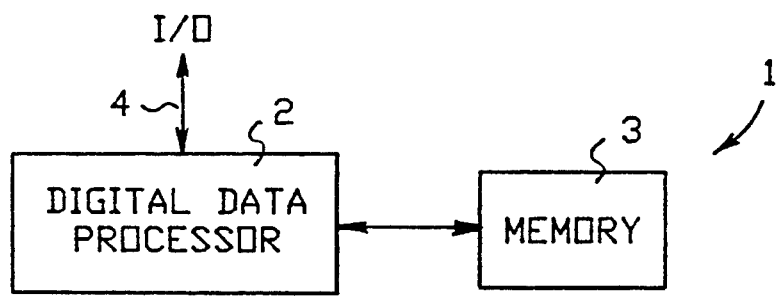
FIG. 2 illustrates in block diagram fashion one embodiment of a digital data processing system suitable for practicing a method of the invention.

FIG. 2 illustrates in block diagram form one embodiment of a digital data processing system suitable for practicing the method of the invention. System 1 includes a digital data processor 2 that is bidirectionally coupled to a memory 3 for reading instructions and data therefrom and for storing data therein. The instructions include instructions executed by the digital data processor 2 to accomplish the steps of the method of the invention. The data stored within memory 3 includes digital data expressive of the search tree 10 and the various variables, data structures and tables described below. An input/output port 4 provides access to user commands and input data and permits results to be outputted. It should be realized that the embodiment of FIG. 2 is but one suitable embodiment of a digital data processing system and that other embodiments, such as multiprocessor systems, are also suitable for use.

Figure 3:
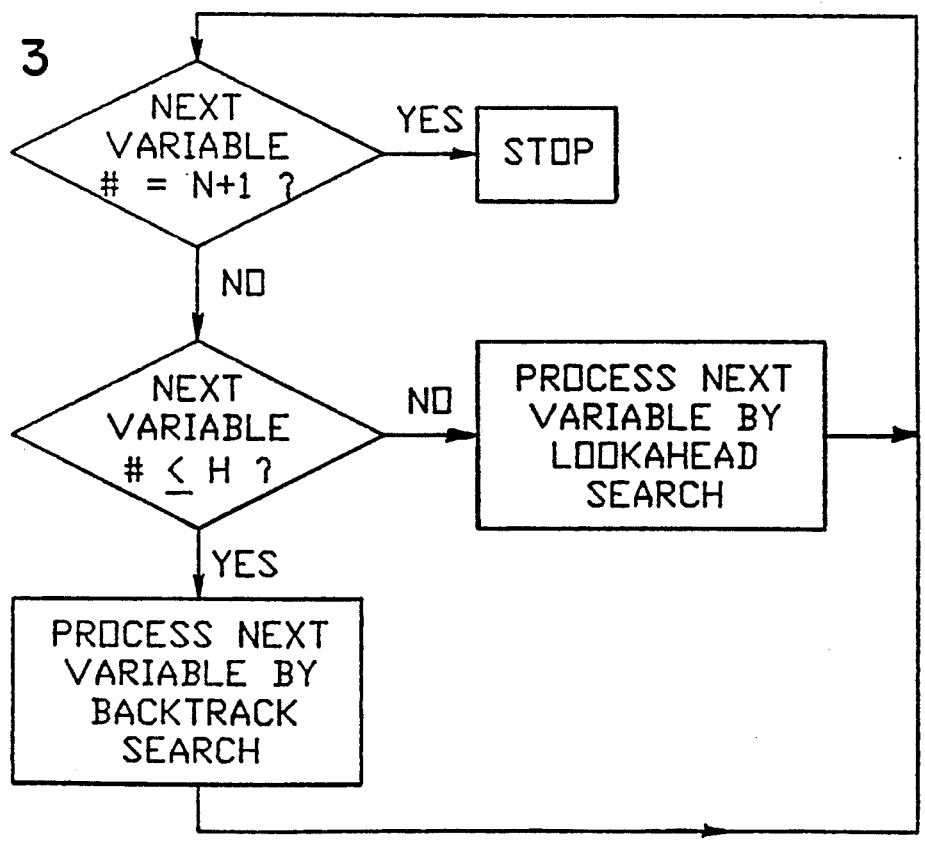
FIG. 3 is a flowchart illustrating the method of the invention.

There is next described, in relation to the flowcharts of FIG. 3 and FIG. 4, the execution of the Hybrid Search technique for determining all solutions to a constraint-satisfaction problem G. Variables $X_1, X_2, \ldots, X_N$ are represented by integers 1 through N. CURRENT is an integer representing the current level of tree search, and is incremented at each level of the tree search 10. The root node of the tree 10 is defined to be at Level 1. At level i of the search tree 10 variables $X_i, X_{(i+1)}, \ldots, X_N$ remain to be bound. For variable numbers equal to or less than H (Block A, FIG. 3) the method first operates in the backtrack search mode (Block B, FIG. 3) and attempts to bind $X_1$ to an element from its domain $D_1$ such that no constraints are violated. If successful, the method attempts to bind $X_2$ to an element from $D_2$ so that $X_1$ and $X_2$ are consistent. If successful, the method attempts to bind the next free variable $X_3$ and proceeds so forth. If all possible values have been attempted for a variable $X_i$, the search backtracks to a previous level, a different value is assigned, if possible, to $X_{(i-1)}$, and the search proceeds in the forward direction. This continues until all $X_N$ variables have been bound (Block D, FIG. 3) at which time the method terminates (Block E, FIG. 3).

After the first H variables, namely, $X_1, X_2 \ldots, X_H$, have been bound successfully the method terminates the backtrack search mode and continues to execute the search in lookahead mode (Block C, FIG. 3, Block A, FIG. 4). A number of suitable lookahead search techniques can be employed although in a presently preferred embodiment of the invention the lookahead technique described in Appendix A and in the flowchart of FIG. 4 is used. The lookahead search mode is accomplished as follows.

Given the current bindings for variables $X_1, X_2, \ldots, X_H$, as determined from the backtrack search, there is determined for each Variable $X_i$, $H<i\leq N$, a list of feasible values, that is a subset of $D_i$, any one of which may be possibly assigned to $X_i$ (Block B, FIG. 4). The array of lists of feasible values for the different free variables is stored in memory 3 within a Feasible_Value table (Block C, FIG. 4). Assuming at Level i, $H<i\leq N$ a specific binding decision is made for free variable $X_i$. One effect of the specific binding decision is to constrain the possible values that can be taken by the remaining free variables. As such, a revised Feasible_Value table is determined. The procedures set forth below in Appendix A, namely Look_Ahead_Search and Check_Forward, provide a description of the steps of the method for executing the search at levels greater than H. When procedure Look_Ahead_Search is first called the value of CURRENT is initially set to (H+1). Thus, the Variable $X_{H+1}$ is the first to be assigned a value in lookahead search mode. The method selects a next value from the list of feasible values for the current variable (Block D, FIG. 4). Due to the properties of the lookahead search process and the Forward Checker the selected value is guaranteed to be consistent with all previously assigned variable-value pairs.

The lookahead search technique attempts to determine if any of the remaining free variables would become infeasible, i.e., have no value that is consistent with the current variable-value pair (Block E, FIG. 4). If every free variable has some value in the Feasible_Value table that is consistent with the current variable-value pair, then the tree search moves forward to the next variable (Block F, FIG. 4). If there is some free variable having no value in the Feasible_Value table that is consistent with the current variable-value pair, then the tree search remains at the current level with the current variable and continues by selecting the next value from the Feasible_Value table (Block G and H, FIG. 4). If there is no value in the table, the method backtracks to the previous variable and the associated previous Feasible_Value table (Block G, I, and J, FIG. 4). If as a result of backtracking the variable number is once again $\leq H$ then the lookahead search mode is terminated and the backtrack search mode is once more initiated (Block A, FIG. 3).

As can be appreciated the method described above and illustrated in FIG. 3 reduces to a pure backtrack search if the value of H is set to N and reduces to a pure lookahead search if H is set to zero. In general, the value chosen for H is empirically determined and is a function of the nature of the applications that are formulated as constraint-satisfaction search problems.

As an example, in the aforementioned N-Queens problem a reasonable heuristic value for H is N/3. Thus, the first N/3 levels of the search tree are searched with a backtrack search procedure followed by a lookahead search for the remaining, deeper levels.

While the invention has been particularly shown and described with respect to a preferred embodiment thereof, it will be understood by those skilled in the art that changes in form and details may be made therein without departing from the scope and spirit of the invention.

---
APPENDIX A
---

```
Procedure Look_Ahead_Search(CURRENT,F,FVT);
{ FVT is Feasible_Value Table, an array of lists of
feasible values
   New_FVT is New Feasible_Value Table, a revised array of
lists
   F is an array storing the values assigned to the bound
variables}
      for F(CURRENT) = each element of FVT(CURRENT) do
         begin
            if CURRENT < N then     {N = number of variables}
            begin
               New_FVT:=Check_Forward(CURRENT,
               F(CURRENT),FVT);
               if New_FVT is not emptytable then
               call Look_Ahead_Search(CURRENT +
               1,F,New_FVT);
            end
         else
            output the solution F;
      end
end Look_Ahead_Search;
   Procedure Check_Forward(CURRENT,L,FVT);
{ The impact of a tentative binding of L to CURRENT is
evaluated,
   FVT, the Feasible Value Table, is revised and a revised
   table called New_FVT is returned
      New_FVT:=emptytable;
      for free_var:= CURRENT+1 to N do
         begin
            for tentative_value:= each element of FVT(free_var)
            if assigning L to CURRENT and tentative_value to
            free_var are compatible then enter tentative_value
            into the list of feasible values for free_var in
            New_FVT;
            if New_FVT(free_var) is empty {no feasible values
               for free_var}
            then do; New_FVT:= emptytable;
                 return (New_FVT);
               end;
         end;
         return(New_FVT);
      end check_forward;
```

Having thus described my invention, what I claim as new, and desire to secure by Letters Patent is:

1. Apparatus for solving an instance of a constraint-satisfaction problem, comprising:

memory means for storing a search tree data structure representing a plurality (N) of variables (X) associated with the instance of the constraint-satisfaction problem, the search tree data structure having a plurality of levels; and digital data processor means that is coupled to the memory means, the digital data processor means including means for executing instructions for searching, in accordance with a backtrack search method, (L) shallow levels of the search tree data structure, wherein (L) is less than or equal to a specified value H, and for searching, in accordance with a lookahead search method, (M) deeper levels of the search tree data structure, wherein (M) is greater than the specified value H; and wherein the memory means further stores a Feasible_Value Table data structure that is constructed by the digital data processor means while searching the (M) remaining deeper levels of the search tree structure with the lookahead search method.

2. Apparatus as set forth in claim 1 and further comprising an input/output port coupled to the digital data processor means for outputting a result of the search of the search tree data structure.

3. Apparatus as set forth in claim 1 wherein the Feasible_Value Table is constructed by the digital data processor means in response to a set of current bindings for a set of variables $X_1$ through $X_H$, as determined by the backtrack search method, by determining for each variable $X_i$, wherein $H < i \leq N$, a list of feasible values that is a subset of a $Domain_i$, wherein any one of the feasible values could be assigned to $X_i$.

4. Apparatus for solving an instance of a constraint-satisfaction problem, comprising:

memory means for storing a search tree data structure representing a plurality (N) of variables (X) associated with the constraint-satisfaction problem, the search tree data structure having a plurality of levels; and digital data processor means that is coupled to the memory means, the digital data processor means including means for executing instructions for searching, in accordance with a backtrack search method, (L) shallow level of the search tree data structure, wherein (L) is less than or equal to a specified value H, and for searching, in accordance with a lookahead search method, (M) deeper levels of the search tree data structure, wherein (M) is greater than the specified value H; and wherein the memory means further stores a plurality of Feasible_Value Table data structures each of which is associated with a level of the search tree data structure, each of the plurality of Feasible_Value Table data structures being constructed by the digital data processor means while searching the (M) remaining deeper levels of the search tree structure with the lookahead search method.

5. Apparatus as set forth in claim 4 wherein the digital data processor means is operable for constructing the Feasible_Value Table data structures within the memory means by selecting, for a current variable being processed, a next feasible value from the Feasible_Value Table so as to produce a current variable-value pair, by determining if all remaining free variables have an associated value that is consistent with the current variable-value pair, and, if every remaining free variable is determined to have an associated value that is consistent with the current variable-value pair, by copying all consistent variable-value pairs to a new Feasible_Value Table that is associated with a next, deeper level of the search tree structure, and, if any remaining free variables are determined to not have an associated value consistent with the current variable-value pair, by selecting for the current variable a next value from the Feasible_Value Table data structure to produce another current variable-value pair.

* * * * *